(12) United States Patent
Hu et al.

(10) Patent No.: US 8,964,320 B1
(45) Date of Patent: Feb. 24, 2015

(54) DISK DRIVE DEFECT SCANNING BY WRITING CONSECUTIVE DATA TRACKS AND SKIPPING TRACKS WHEN READING THE DATA TRACKS

(75) Inventors: Petrus Hu, Singapore (SG); Hasni Zaidy Abdul Hamid, Kuala Lumpur (MY); Gunawathi Gunasekaran, Puchong (MY)

(73) Assignee: Western Digital Technologies, Inc., Irvine, CA (US)

( * ) Notice: Subject to any disclaimer, the term of this patent is extended or adjusted under 35 U.S.C. 154(b) by 1112 days.

(21) Appl. No.: 12/964,480

(22) Filed: Dec. 9, 2010

(51) Int. Cl.
  *G11B 19/04* (2006.01)

(52) U.S. Cl.
  CPC .................................. *G11B 19/048* (2013.01)
  USPC .............................................. 360/31; 360/25

(58) Field of Classification Search
  None
  See application file for complete search history.

(56) References Cited

U.S. PATENT DOCUMENTS

| | | |
|---|---|---|
| 5,150,050 A | 9/1992 | Genheimer et al. |
| 5,195,076 A | 3/1993 | Aoki |
| 5,216,655 A | 6/1993 | Hearn et al. |
| 5,280,395 A | 1/1994 | Matsuzaki |
| 5,895,438 A | 4/1999 | Yomtoubian |
| 6,057,926 A | 5/2000 | Horai |
| 6,104,556 A | 8/2000 | Schaenzer |
| 6,151,180 A | 11/2000 | Bang |
| 6,219,814 B1 | 4/2001 | Coker et al. |
| 6,223,303 B1 | 4/2001 | Billings et al. |
| 6,239,931 B1 | 5/2001 | Chung et al. |
| 6,301,679 B1 | 10/2001 | Tan |
| 6,304,986 B1 * | 10/2001 | Ma et al. ........................ 714/718 |
| 6,366,081 B1 | 4/2002 | Tan et al. |
| 6,384,999 B1 | 5/2002 | Schibilla |
| 6,405,342 B1 | 6/2002 | Lee |
| 6,496,943 B1 | 12/2002 | Belser et al. |
| 6,504,662 B2 | 1/2003 | Sobey |
| 6,606,211 B1 | 8/2003 | Lim et al. |
| 6,654,904 B1 | 11/2003 | Andoh et al. |
| 6,691,255 B1 | 2/2004 | Rothberg et al. |
| 6,704,153 B1 | 3/2004 | Rothberg et al. |
| 6,731,442 B2 | 5/2004 | Jin et al. |
| 6,850,379 B2 | 2/2005 | Andoh et al. |
| 6,940,669 B2 | 9/2005 | Schaenzer et al. |
| 6,947,232 B2 | 9/2005 | Lim et al. |
| 6,950,967 B1 | 9/2005 | Brunnett et al. |
| 6,985,319 B2 | 1/2006 | Yip et al. |
| 7,047,438 B2 | 5/2006 | Smith et al. |
| 7,072,129 B1 | 7/2006 | Cullen et al. |
| 7,139,145 B1 | 11/2006 | Archibald et al. |
| 7,215,494 B2 * | 5/2007 | Wang et al. ...................... 360/31 |
| 7,215,619 B1 | 5/2007 | Van Den Enden |
| 7,248,547 B2 | 7/2007 | Ryu et al. |
| 7,389,588 B2 | 6/2008 | Lau |
| 7,434,019 B2 | 10/2008 | Chia et al. |
| 7,562,270 B2 | 7/2009 | Andoh |
| 7,589,926 B2 | 9/2009 | Richmond et al. |
| 7,626,905 B2 | 12/2009 | Lai et al. |
| 7,653,847 B1 * | 1/2010 | Liikanen et al. ................ 360/31 |

(Continued)

*Primary Examiner* — Wayne Young
*Assistant Examiner* — James L Habermehl

(57) ABSTRACT

A disk drive is disclosed comprising a head actuated over a disk comprising a plurality of data tracks. A plurality of consecutive data tracks are written, and after writing to the plurality of consecutive data tracks, a first number of the consecutive data tracks are read and a second number of the consecutive data tracks are skipped, wherein the second number of data tracks are interleaved with the first number of data tracks. Defects in the data tracks are detected in response to reading the first number of data tracks.

6 Claims, 5 Drawing Sheets

(56) References Cited

U.S. PATENT DOCUMENTS

| | | |
|---|---|---|
| 7,656,763 B1 | 2/2010 | Jin et al. |
| 7,839,588 B1 | 11/2010 | Dang et al. |
| 7,957,241 B2 | 6/2011 | Vaes |
| 8,014,094 B1 | 9/2011 | Jin |
| 8,023,215 B1 | 9/2011 | Ghaly et al. |
| 8,493,681 B1 | 7/2013 | Selvaraj |
| 8,619,529 B1 | 12/2013 | Liew et al. |
| 2001/0046196 A1 | 11/2001 | Mckernan |
| 2001/0055172 A1 | 12/2001 | Yip et al. |
| 2002/0048112 A1 | 4/2002 | Chu et al. |
| 2002/0191319 A1 | 12/2002 | Liew et al. |
| 2004/0100715 A1 | 5/2004 | Smith et al. |
| 2004/0153949 A1 | 8/2004 | Ro et al. |
| 2004/0233805 A1 | 11/2004 | Yoshida et al. |
| 2005/0138464 A1 | 6/2005 | Chong et al. |
| 2005/0180282 A1 | 8/2005 | Ouyang et al. |
| 2006/0056088 A1 | 3/2006 | Kudoh et al. |
| 2006/0126204 A1 | 6/2006 | Taniguchi et al. |
| 2007/0089031 A1 | 4/2007 | Huffman et al. |
| 2007/0183074 A1 | 8/2007 | Smith |
| 2007/0279788 A1 | 12/2007 | Andersen et al. |
| 2008/0239548 A1 | 10/2008 | Paul et al. |
| 2009/0034109 A1 | 2/2009 | Paul et al. |
| 2009/0290463 A1 | 11/2009 | Kuze et al. |
| 2010/0091629 A1 | 4/2010 | Tan et al. |
| 2010/0177428 A1 | 7/2010 | Oberg |
| 2011/0158073 A1 | 6/2011 | Ishihara et al. |

\* cited by examiner

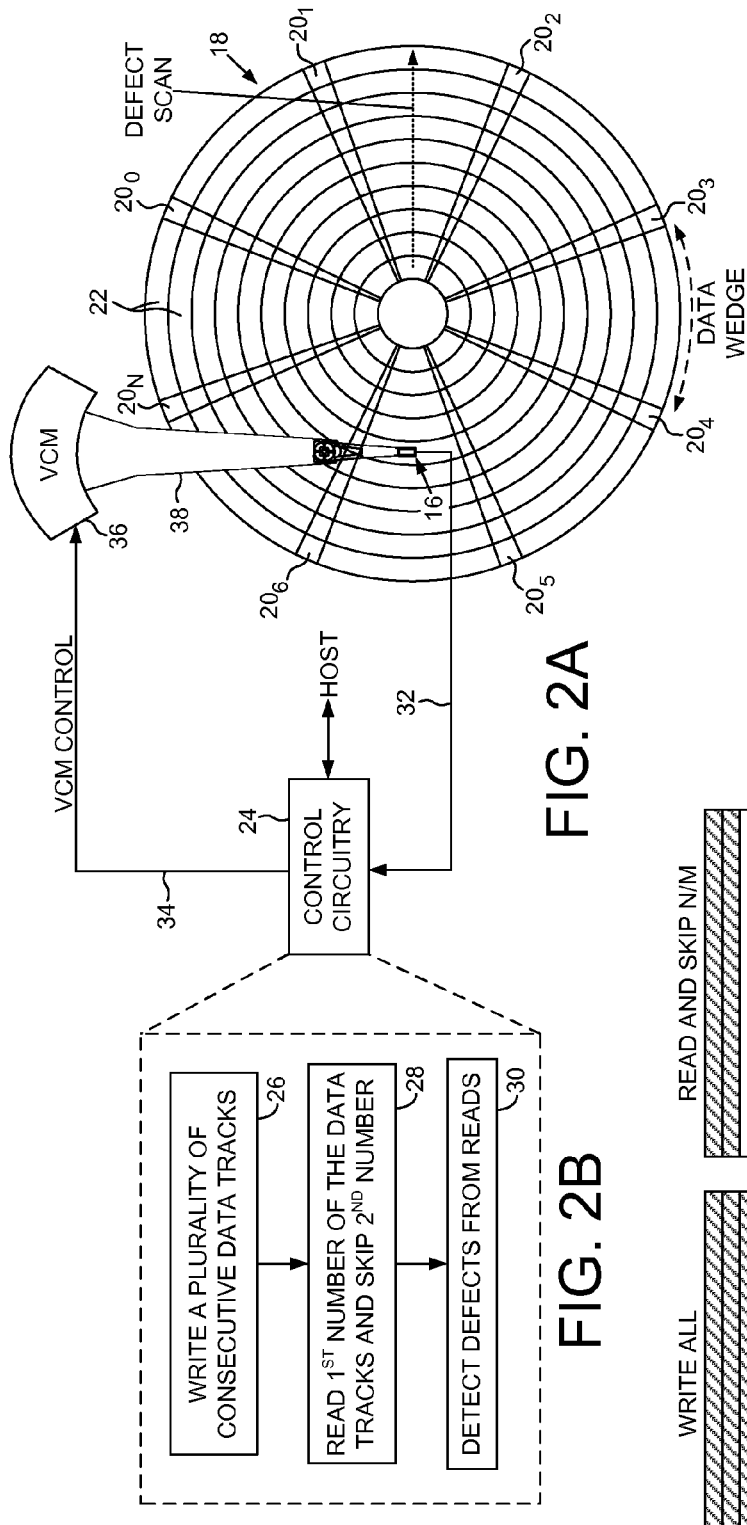
FIG. 2A
FIG. 2B
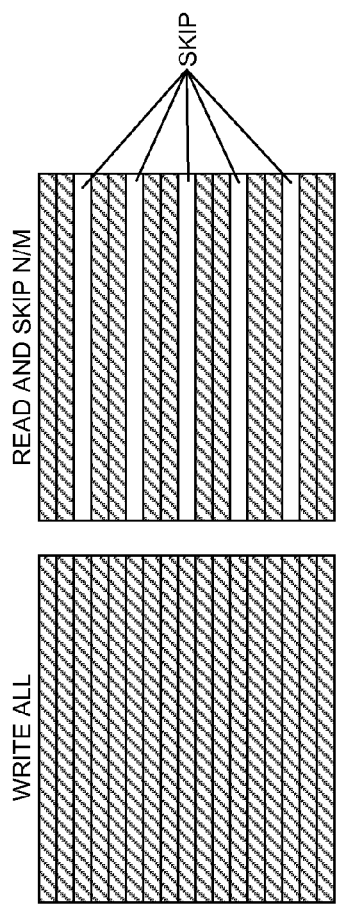
FIG. 2C

DISK DRIVE DEFECT SCANNING BY WRITING CONSECUTIVE DATA TRACKS AND SKIPPING TRACKS WHEN READING THE DATA TRACKS

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

FIG. 1 shows a prior art disk format 4 as comprising a number of data tracks 6 defined by servo sectors $2_0$-$2_N$ recorded around the circumference of the disk. Each servo sector $2_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $2_i$ further comprises groups of servo bursts 14, which are recorded with precise intervals and offsets relative to the track centerlines. The servo bursts 14 provide fine head position information used for centerline tracking while accessing a data track during write/read operations.

Each data sector in a data track is typically assigned a physical block address (PBA) which is accessed indirectly through a logical block address (LBA) to facilitate mapping out defective data sectors. A PBA associated with defective data sectors may simply remain unmapped if found during manufacturing. The process of initially mapping out defective PBAs is referred to as "formatting" the disk.

Scanning for defective data sectors during manufacturing of the disk drive typically involves writing a special test pattern (e.g., a 2T pattern) to each data sector (or each data wedge) and reading the test pattern to identify defects. For example, a drop in the amplitude of the read signal may indicate a defect, or a defect filter matched to a defect signature may indicate a defect, or a number of bit errors exceeding a threshold may indicate a defect, etc.

BRIEF DESCRIPTION OF THE DRAWINGS

FIG. 2A shows a disk drive according to an embodiment of the present invention comprising a head actuated over a disk.

FIGS. 2B and 2C illustrate an embodiment of the present invention wherein a plurality of consecutive data tracks are first written, and then a subset of the data tracks are read to detect defects (N/M of the data tracks are skipped).

DETAILED DESCRIPTION OF EMBODIMENTS OF THE INVENTION

Figure 1:
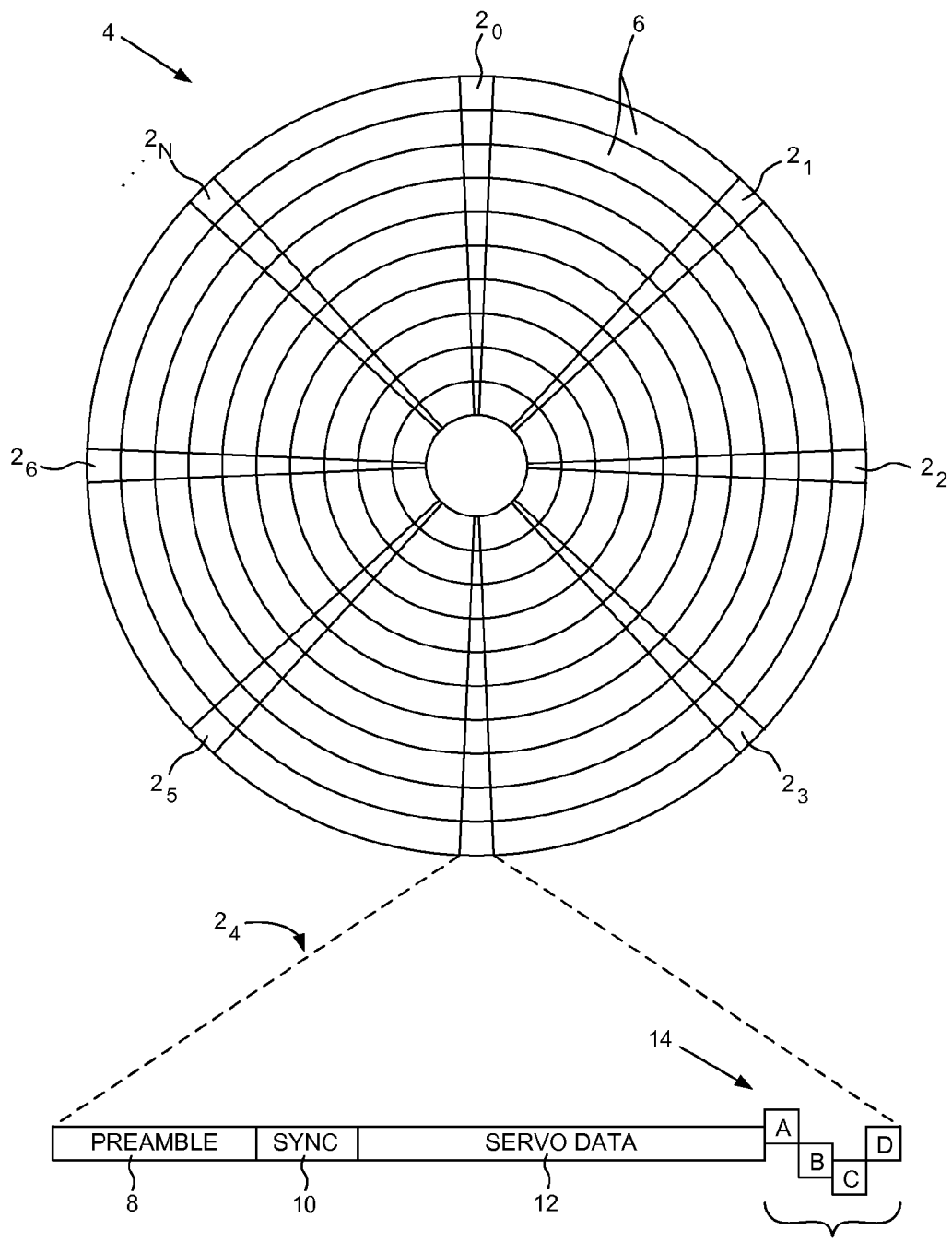
FIG. 1 shows a prior art disk format comprising a plurality of data tracks defined by embedded servo sectors.

FIG. 2A shows a disk drive according to an embodiment of the present invention comprising a head 16 actuated over a disk 18 comprising a plurality of data tracks 22. The disk drive further comprises control circuitry 24 operable to execute the flow diagram of FIG. 2B, wherein a plurality of consecutive data tracks are written (step 26) as illustrated in FIG. 2C. After writing to the plurality of consecutive data tracks, a first number of the consecutive data tracks are read and a second number of the consecutive data tracks are skipped (step 28), wherein the second number of data tracks are interleaved with the first number of data tracks as illustrated in FIG. 2C. Defects in the data tracks are detected in response to reading the first number of data tracks (step 30).

In the disk drive of FIG. 2A, a plurality of embedded servo sectors $20_0$-$20_N$ are recorded on the disk 18 to define the plurality of data tracks 22 each comprising a number of data sectors. Each servo sector comprises suitable position information, such as a track address providing coarse position information and servo bursts providing fine position information. As the head 16 passes over a servo sector, the control circuitry 24 demodulates a read signal 32 emanating from the head into a position error signal (PES). The PES is filtered by a suitable compensation filter to generate a control signal 34 applied to a voice coil motor (VCM) 36. The VCM 36 rotates an actuator arm 38 about a pivot in order to position the head 16 radially over the disk 18 in a direction that reduces the PES.

Any suitable head may be employed in the embodiments of the present invention. In one embodiment, the head comprises a magnetoresistive (MR) read element, and a perpendicular magnetic recording (PMR) write element. Certain write element designs may generate varying adjacent track interference (ATI) depending on the radial direction of the write operation. That is, the ATI that manifests when writing data tracks toward the inner diameter of the disk may be different from the ATI that manifests when writing data tracks toward the outer diameter of the disk. The varying effect of ATI can impact the result of a defect scan such that a first set of defects may be detected if the data tracks are written in a first radial direction, whereas a second set of defects (some mutually exclusive from the first set) may be detected if the data tracks are written in a second radial direction. Therefore, if a defect scan is performed by writing the data tracks in only one radial direction, some of the defects may be missed. Accordingly, an embodiment of the present invention performs a defect scan in a first phase wherein data is written to the data tracks in a first radial direction, and in a second phase wherein data is written to the data tracks in a second (opposite) radial direction.

Any suitable data may be written to the data tracks during the defect scan, and any suitable technique may be employed to detect a defect. In one embodiment, a test pattern (e.g., a 2T test pattern) is written to the data tracks and degradation of the resulting read signal (e.g., amplitude degradation, phase degradation, etc.) may then identify a defect. In another embodiment, the data written to the data tracks may comprise pseudo user data (e.g., all zeros or a random pattern), wherein a defect is detected when the number of errors detected by an error correction code (ECC) exceeds a threshold. In another embodiment, a defect may be detected based on the number of retry operations needed to recover a data sector.

In one embodiment, each data track 22 in FIG. 2A is divided into a number of data sectors, wherein during the defect scan data is written to and read from each data sector. In an alternative embodiment, during the defect scan data may be written over an entire data wedge (area between servo sectors) as illustrated in FIG. 2A. In one embodiment, data may be written to each data wedge during a first phase of the defect scan, and data may written to each data sector during a second phase of the defect scan.

Figure 3:
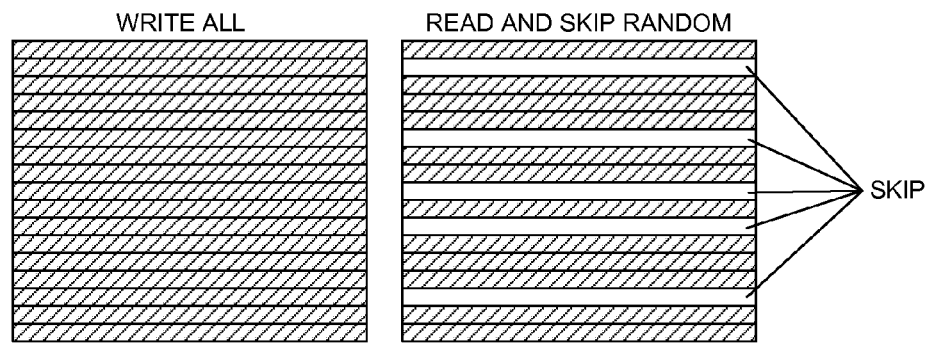
FIG. 3 illustrates an embodiment of the present invention wherein the data tracks that are skipped during the defect scan are interleaved randomly with the data tracks that are read.

In one embodiment, only a subset of the written data tracks are read during at least one phase of the defect scan in order to decrease the time needed to perform the defect scan. When defect scanning a plurality of consecutive data tracks, all of the data tracks are written so that the effective of adjacent track interference during the write operation affects all of the data tracks, including the data tracks that are skipped when reading the consecutive data tracks. Any suitable subset of the consecutive data tracks may be read and the remaining data tracks skipped. For example, in one embodiment every N out of M of the consecutively written data tracks are skipped, such as every 1 out of 3 data tracks as illustrated in the embodiment shown in FIG. 2C. In another embodiment illustrated in FIG. 3, the skipped data tracks may be randomly interleaved with the data tracks that are read. In another embodiment, more than one data track may be skipped at a time (e.g., skipping two consecutive data tracks at a time).

In one embodiment, when a defective is detected in one of the data tracks that is read during the defect scan, a predetermined area of the data track (e.g., one or more data sectors or data wedges) may be mapped out as unusable. In addition, all or part of one or more adjacent data tracks may be mapped out as defective. That is, in one embodiment it is assumed a defect detected in one of the data tracks will typically affect one or more of the adjacent data tracks in at least one direction (toward the inner diameter or outer diameter of the disk). Accordingly, in one embodiment all or part of a data track not read during the defect scan may still be mapped out as defective due to detecting a defect in an adjacent (or near adjacent) data track that is read during the defect scan. In yet another embodiment, a data track that would otherwise be skipped during the defect scan may be read and evaluated for defects if a defect is detected while reading an adjacent data track.

During each phase of the defect scan, any suitable number of consecutive data tracks may be written at a time before executing the corresponding read operation. In the example embodiment of FIG. 2A, during a first phase of the defect scan all of the data tracks across the radius of the disk are written in a first radial direction (e.g., from the ID to OD) and then all or a subset of the data tracks are read to detect defects. During a second phase of the defect scan all of the data tracks across the radius of the disk are written in a second (opposite) radial direction and then all or a subset of the data tracks are read to detect defects. In an alternative embodiment, the data tracks may be processed in segments across the radius of the disk by writing and then reading a predetermined number of data tracks at a time.

Figure 4A:
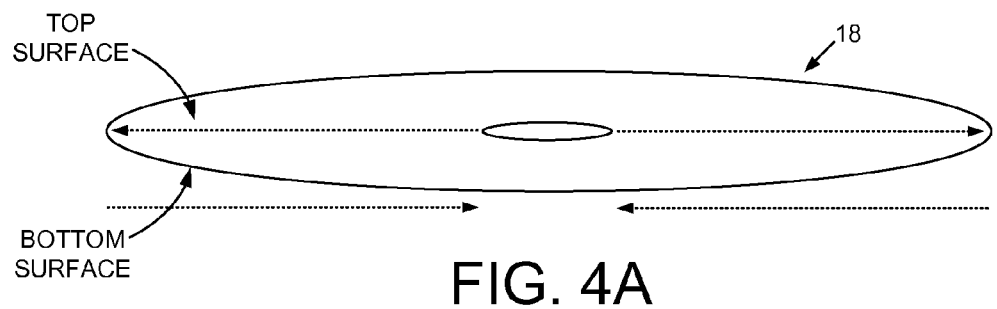
FIGS. 4A and 4B show an embodiment of the present invention wherein during a first defect scan the data tracks are written in a first direction, and during a second defect scan the data tracks are written in a second direction opposite the first direction.
Figure 4B:
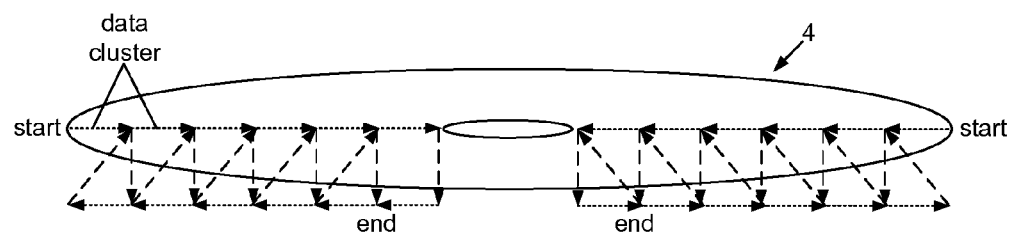

FIG. 4A illustrates an embodiment of the present invention wherein during a first phase of the defect scan, data is written across the radius of a first disk surface (e.g., top disk surface), and then data is written across the radius of a second disk surface (e.g., bottom disk surface). Thereafter data is read from the first disk surface to detect defects, and data is read from the second disk surface to detect defects. In one embodiment, the first phase of the defect scan is carried out as shown in FIG. 4A by writing a 2T test pattern to each data track as described above. When finished with the first phase of the defect scan for the first and second disk surfaces, a second phase of the defect scan writes pseudo user data to each data sector of the first and second disk surfaces and the number of ECC errors evaluated during the read operation. In one embodiment, the data sectors are written according to a sequence of logical block addresses (LBAs) such that the write operation follows a serpentine pattern of data clusters across the multiple disk surfaces as illustrated in FIG. 4B. Further details of an example sequence of LBAs that follows a serpentine pattern of data clusters is disclosed in U.S. Pat. No. 7,436,610 entitled "DISK DRIVE EMPLOYING DIFFERENT ZONE BOUNDARIES ACROSS DISK SURFACES" the disclosure of which is incorporated herein by reference.

Figure 5:
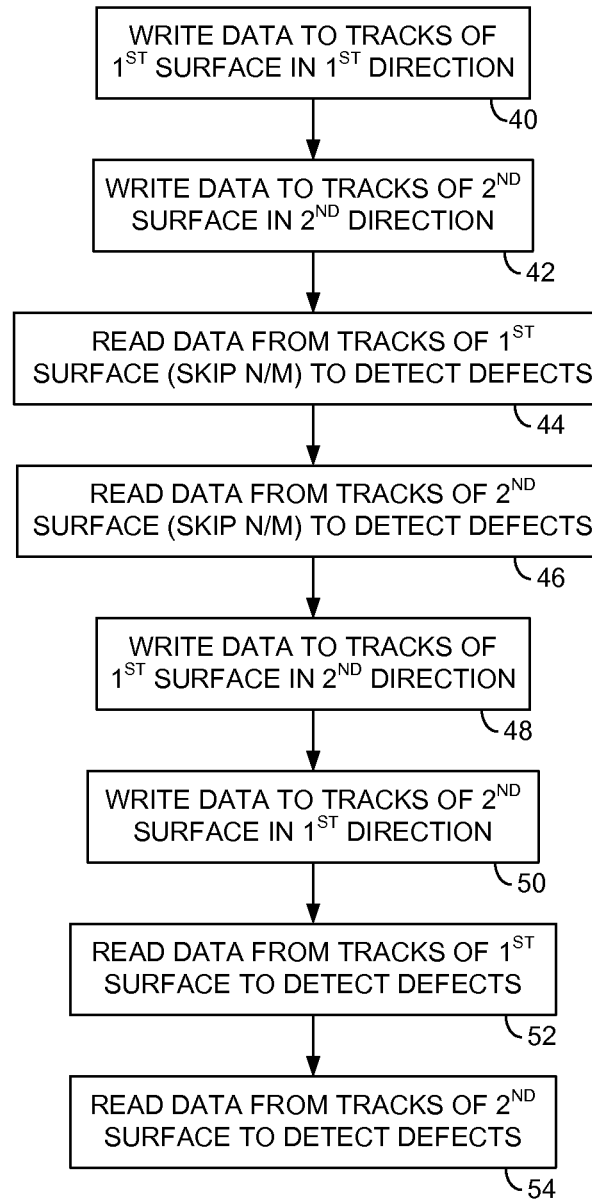
FIG. 5 is a flow diagram according to an embodiment of the present invention wherein during a first defect scan in a first direction, a subset of the data tracks are read and the remaining data tracks are skipped, and during a second defect scan in a second direction, all of the data tracks are read.

FIG. 5 is a flow diagram according to an embodiment of the present invention wherein a two phase defect scan is performed on multiple disk surfaces. A first write operation writes data in a first radial direction to a plurality of data tracks on a first disk surface (step 40) such as a top disk surface as shown in FIG. 4A. A second write operation writes data in a second radial direction to a plurality of data tracks on a second disk surface (step 42) such as a bottom disk surface as shown in FIG. 4A. The data is read from a subset of the data tracks on the first disk surface to detect defects (step 44), and the data is read from a subset of the data tracks on the second disk surface to detect defects (step 46). A third write operation writes data in the second radial direction to a plurality of data tracks on the first disk surface (step 48) such as the top disk surface as shown in FIG. 4B. A fourth write operation writes data in the first radial direction to a plurality of data tracks on the second disk surface (step 50) such as the bottom disk surface as shown in FIG. 4B. The data is read from the data tracks on the first disk surface to detect defects (step 52), and the data is read from the data tracks on the second disk surface (step 54) to detect defects. In the above example, the order of the read operations may be reversed such that the second disk surface is read first.

Figure 6A:
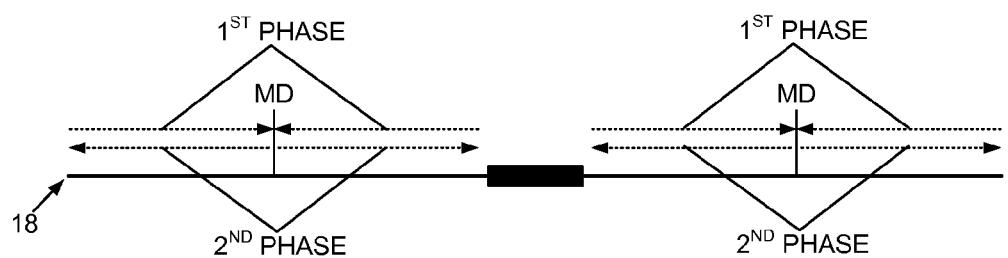
FIGS. 6A and 6B show embodiments of the present invention wherein the data tracks may be written and read in opposite directions over any suitable section of the disk surface.
Figure 6B:
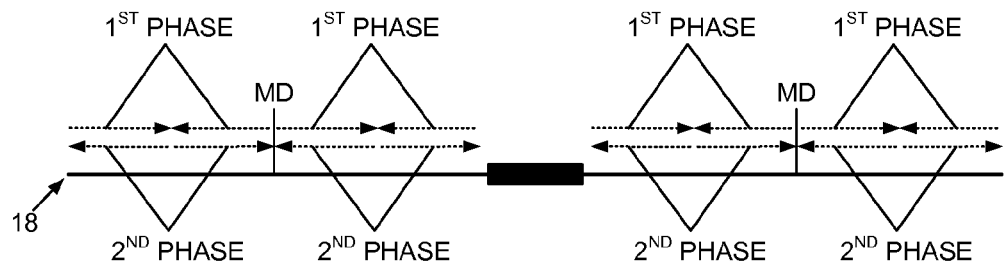

The data may be written to a disk surface in any suitable pattern, wherein the data may be written in a first radial direction during a first phase of the defect scan and in an opposite radial direction during a second phase of the defect scan. FIGS. 6A and 6B illustrate alternative patterns for writing data to a disk surface during the first phase and second phase of the defect scan relative to a middle diameter (MD) of the disk 18. When reading the data tracks to detect defects, certain of the data tracks may be skipped as described above during one or both phases of the defect scan.

In one embodiment, the technique of skip reading data tracks during the defect scan as described above may not be implemented over the entire disk surface. For example, in one embodiment on or more sections of the disk may comprise a consecutive band of data tracks having significant importance such that every data track in the section should be read and evaluated during the defect scan. For example, a certain number of test tracks may be reserved to calibrate parameters of the disk drive, wherein verifying the integrity of the test tracks helps ensure proper calibration. In other embodiments, a number of consecutive data tracks may be reserved to store the calibrated parameters and/or an operating system for the disk drive, wherein reading the reserved tracks during the defect scan helps ensure proper operation of the disk drive. In another embodiment, at least some of the data tracks for storing the host operating system may be known or assumed (e.g., the data tracks corresponding to low numbered logical block addresses). Reading and evaluating these data tracks during the defect scan may help maintain the integrity of the host operating system. In yet another embodiment, the disk may be divided into a number of refresh zones, wherein each refresh zone may include a number of reserved data tracks that facilitate a refresh operation. For example, the reserved data tracks may be used to temporarily store a backup copy of data being refreshed, wherein reading the reserved tracks during the defect scan helps ensure the backup copy of the data is not lost during the refresh operation.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of data tracks;
a head actuated over the disk; and
control circuitry operable to:
  write to a plurality of consecutive data tracks;
  after writing to the plurality of consecutive data tracks, read a first number of the consecutive data tracks and skip a second number of the consecutive data tracks, wherein the second number of data tracks are interleaved with the first number of data tracks; and
  detect defects in the data tracks in response to reading the first number of data tracks,
  wherein the second number of data tracks are randomly interleaved with the first number of data tracks.

2. The disk drive as recited in claim 1, wherein the first plurality of consecutive data tracks spans substantially the entire disk.

3. The disk drive as recited in claim 1, wherein the first plurality of consecutive data tracks spans substantially less than the entire disk.

4. A method of operating a disk drive comprising a head actuated over a disk comprising a plurality of data tracks, the method comprising:
  writing to a plurality of consecutive data tracks;
  after writing to the plurality of consecutive data tracks, reading a first number of the consecutive data tracks and skip a second number of the consecutive data tracks, wherein the second number of data tracks are interleaved with the first number of data tracks; and
  detecting defects in the data tracks in response to reading the first number of data tracks,
  wherein the second number of data tracks are randomly interleaved with the first number of data tracks.

5. The method as recited in claim 4, wherein the first plurality of consecutive data tracks spans substantially the entire disk.

6. The method as recited in claim 4, wherein the first plurality of consecutive data tracks spans substantially less than the entire disk.

* * * * *